United States Patent
Lumbatis et al.

(10) Patent No.: US 11,606,340 B2
(45) Date of Patent: Mar. 14, 2023

(54) METHOD TO ANONYMIZE CLIENT MAC ADDRESSES FOR CLOUD REPORTING

(71) Applicant: ARRIS Enterprises LLC, Suwanee, GA (US)

(72) Inventors: Kurt Alan Lumbatis, Dacula, GA (US); William Charles Hare, Jr., Cumming, GA (US); Ali Negahdar, Duluth, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 506 days.

(21) Appl. No.: 16/804,989

(22) Filed: Feb. 28, 2020

(65) Prior Publication Data
US 2020/0280542 A1 Sep. 3, 2020

Related U.S. Application Data

(60) Provisional application No. 62/812,242, filed on Feb. 28, 2019.

(51) Int. Cl.
*H04L 9/32* (2006.01)
*H04L 29/06* (2006.01)
(Continued)

(52) U.S. Cl.
CPC ........ *H04L 63/0421* (2013.01); *H04L 9/3242* (2013.01); *H04L 63/0236* (2013.01);
(Continued)

(58) Field of Classification Search
CPC ............... H04L 9/3242; H04L 63/0236; H04L 63/0272; H04L 63/0281; H04L 63/0876;
(Continued)

(56) References Cited

U.S. PATENT DOCUMENTS 9,590,950 B2 *  3/2017  Hallett .............. H04L 63/0421
2011/0010563 A1  1/2011  Lee et al.
(Continued)

FOREIGN PATENT DOCUMENTS

WO    WO-2017026930 A1 *  2/2017

OTHER PUBLICATIONS

Notification of Transmittal of the International Search Report and the Written Opinion of the International Searching Authority dated Apr. 24, 2020 in International Application No. PCT/US2020/020376.

(Continued)

*Primary Examiner* — Boris D Grijalva Lobos
(74) *Attorney, Agent, or Firm* — Wenderoth, Lind & Ponack, L.L.P.

(57) ABSTRACT

A method for anonymizing user identifiable information to be transmitted outside of a local network includes generating a network entity hash input based on (i) a first MAC address assigned to a client station of the local network, (ii) a second MAC address assigned to the network gateway device of the local network, and (iii) an identifier of a cloud entity of an external network to which data of the client station is to be transmitted. The method further includes generating a hash value output based on the network entity hash input and a random token value using a hashing function, generating an anonymized MAC address associated with the client station (Continued)

based on the hash value output, and transmitting the anonymized MAC address associated with the client station to the cloud entity of the external network.

18 Claims, 5 Drawing Sheets

(51) Int. Cl.
    *H04L 9/40*     (2022.01)
    *H04W 8/26*     (2009.01)
    *H04W 88/16*     (2009.01)
    *H04L 101/622*     (2022.01)

(52) U.S. Cl.
    CPC ...... *H04L 63/0272* (2013.01); *H04L 63/0281* (2013.01); *H04L 63/0876* (2013.01); *H04W 8/26* (2013.01); *H04W 88/16* (2013.01); *H04L 2101/622* (2022.05)

(58) Field of Classification Search
    CPC . H04L 2101/622; H04L 41/00; H04L 41/045; H04L 41/08–0806; H04L 41/0823; H04L 41/0895; H04L 41/40; H04L 45/00; H04L 45/56; H04L 45/566; H04L 45/72; H04L 45/74; H04L 63/00; H04L 63/04–0421; H04L 63/16–168; H04L 63/20; H04L 63/0421; H04W 8/26; H04W 88/16
    See application file for complete search history.

(56) References Cited

U.S. PATENT DOCUMENTS

| | | | |
|---|---|---|---|
| 2015/0045053 A1* | 2/2015 | Barneson | H04W 12/02 455/456.1 |
| 2015/0304283 A1 | 10/2015 | Hallett et al. | |
| 2021/0058376 A1* | 2/2021 | Teissonniere | H04L 63/0421 |

OTHER PUBLICATIONS

Levent Demir et al.: "Analysing the privacy policies of Wi-Fi trackers", Physical Analytics, ACM, 2 Penn Plaza, Suite 701, New York NY 10121-0701 USA, Jun. 11, 2014 (Jun. 11, 2014), pp. 9-44, XP058052782.

Brekne Tonnes et al.: "Anonymization of IP Traffic Monitoring Data: Attacks on Two Prefix-Preserving Anonymization Schemes and Some Proposed Remedies", May 30, 2055 (May 30, 2005), International Conference on Financial Cryptography and Data Security; [Lecture Notes in Computer Science; Lect.Notes Computer], Springer, Berlin, Heidelberg, pp. 179-196, XP047397093.

International Preliminary Report on Patentability dated Aug. 25, 2021 in International (PCT) Application No. PCT/US2020/020376.

* cited by examiner

METHOD TO ANONYMIZE CLIENT MAC ADDRESSES FOR CLOUD REPORTING

BACKGROUND

In a wireless or wired network, attached client identifying information (such as Media Access Control addresses in 48-bit Extended Unique Identifier format, also referred to herein as EUI-48 MAC Addresses) is not allowed to be transmitted outside of the local ecosystem due to existing or emerging privacy laws. Accordingly, it is desirable to perform anonymization of client identifying information which is transmitted to an external network in a reproducible manner such that the same anonymized MAC address derived for a given client is always provided to a given network entity but is unique to that network entity.

SUMMARY

According to some example embodiments of inventive concepts described herein, a method for anonymizing user identifiable information to be transmitted outside of a local network is provided. The method may include generating a first network entity hash input based on (i) a first MAC address assigned to a client station of the local network, (ii) a second MAC address assigned to a network gateway device of the local network, and (iii) a first identifier of a first cloud entity of a first external network to which data of the client station is to be transmitted. The method may further include generating a first hash value output based on the first network entity hash input and a random token value using a hashing function, generating a first anonymized MAC address associated with the client station based on the first hash value output, and transmitting the first anonymized MAC address associated with the client station to the first cloud entity of the first external network.

In some example embodiments, the method may include generating the first anonymized MAC address associated with the client station includes generating the first anonymized MAC address based on the first hash value output according to an offset select function, and applying the offset select function includes using a first offset value as an index into the first hash value output indicating a location of data within the first hash value output to be utilized as a base of the first anonymized MAC address.

In some example embodiments, the method may include generating N additional network entity hash inputs based on (i) the first MAC address assigned to the client station of the local network, (ii) the second MAC address assigned to the network gateway device of the local network, and (iii) N additional identifiers of N additional cloud entities of N additional external networks. The method may further include generating N additional hash value outputs based on the N additional network entity hash inputs and the random token value using the hashing function, respectively, generating N additional anonymized MAC addresses associated with the client station based on the N additional hash value outputs, respectively, and transmitting the N additional anonymized MAC addresses associated with the client station to the N additional cloud entities of the N additional external networks, respectively, where N is a value corresponding to a total number of additional cloud entities of additional external networks to which data of the client station is to be transmitted.

In some example embodiments, the first identifier of the first cloud entity and each of the N additional identifiers of the N additional cloud entities are different from each other, such that the first anonymized MAC address and each of the N additional anonymized MAC addresses are different from each other.

In some example embodiments, the first cloud entity and the N additional cloud entities are upper layer network functions or network servers, and the first identifier of the first cloud entity and the N additional identifiers of the N additional cloud entities are different URL addresses or unique names.

In some example embodiments, in response to the client station leaving the local network and rejoining the local network, the method may further include regenerating the same first anonymized MAC address associated with the client station for the first cloud entity of the first external network, and regenerating the same N additional anonymized MAC addresses associated with the client station for the N additional cloud entities of the N additional external networks, respectively.

According to some other example embodiments of inventive concepts disclosed herein, a network gateway device for anonymizing user identifiable information to be transmitted outside of a local network may be provided. The network gateway device may include a memory storing computer-readable instructions, and a processor configured to execute the computer-readable instructions to perform steps of the above-described method.

According to yet some other example embodiments of inventive concepts disclosed herein, a non-transitory computer-readable medium containing program instructions for anonymizing user identifiable information to be transmitted outside of a local network may be provided. The program instructions, when executed by a processor of a network gateway device, cause the network gateway device to perform steps of the above-described method.

DETAILED DESCRIPTION

For simplicity and illustrative purposes, the principles of the embodiments are described by referring mainly to examples thereof. In the following description, numerous specific details are set forth in order to provide a thorough understanding of some example embodiments. It will be apparent however, to one of ordinary skill in the art, that some other example embodiments may be practiced without limitation to these specific details. In some instances, well known methods and structures have not been described in detail so as not to unnecessarily obscure the example embodiments.

OVERVIEW

Aspects of the present disclosure provide a system and method which uniquely anonymizes user identifiable information (e.g., EUI-48 MAC Addresses of client stations)

transmitted outside of the local network ecosystem. Some example embodiments can be implemented, for example, on Gateway (GW) Devices, and/or any devices in a network ecosystem which provides client data outside the local network ecosystem to external entities (e.g., of a cloud network). In some example embodiments, the local network gateway device may be a cable modem (CM), an optical network unit (ONU), an optical network terminal (ONT), or any other similar device which becomes the gateway for the local network to an external cloud network.

For example, a method is defined and described in this disclosure to meet the privacy requirements of anonymizing client device data such that the privacy laws are met. This method insures that any client identifying information (e.g., EUI-48 MAC address) provided outside the local network ecosystem is unique to the local network ecosystem to which the client device is connected as well as unique to the varying cloud entities to which the client identifying information is provided. Any external network outside of the local ecosystem will be provided the anonymized client identifying information (such that cloud entities of external networks do not receive the 'real' EUI-48 MAC address assigned to the client device). In addition, different cloud entities of different external networks may each be provided with different anonymized client identifying information for a given client device.

In some example embodiments, a crux of the method is to utilize a combination of local network information, client information, and unique identifiers for cloud devices receiving data from the home ecosystem in conjunction with Hashing algorithms to anonymize the client device data on a per local network and per external network cloud entity basis. The hashing method defined is HMAC-SHA256, although other hash algorithms that are known or may be developed in the future could be utilized according to some other example embodiments. The data being utilized is:

1) The CM EUI-48 MAC Address or other local network GW device EUI-48 MAC Address,
2) A Randomized Seed Value (or Token),
3) The Client Station EUI-48 MAC Address,
4) A Cloud Entity Unique Identifier, and
5) An Offset Key (or Offset Value) that serves as an index into the generated Hash indicating the location of the data to utilize as the base of the anonymized EUI-48 MAC address, thereby providing an additional obfuscation layer.

Thus, the anonymized client device data will be unique not only per local network, but also unique per cloud entity of external network(s) to which the anonymized client device data is provided.

For a client device or Station (STA), it must be noted that the 'real' STA EUI-48 MAC address will continue to be used for DATA PLANE communications. However, any external network entity which is gathering data about the STA shall receive the Anonymized EUI-48 MAC address associated with the STA that is created for that particular external network entity. This will prevent data mining of the attached STA devices such that each individual external network entity will receive a different anonymized EUI-48 MAC address for any given STA.

It should also be noted that the anonymized EUI-48 MAC addresses on a per STA basis are unique but can be repeatedly generated for each external network entity. Thus, if a STA leaves a local area network (LAN) and then later rejoins the same LAN, the GW device of that LAN can regenerate the same anonymized EUI-48 MAC addresses for each external network entity to which client data is supplied, respectively.

Implementation—Network Topology

Figure 1:
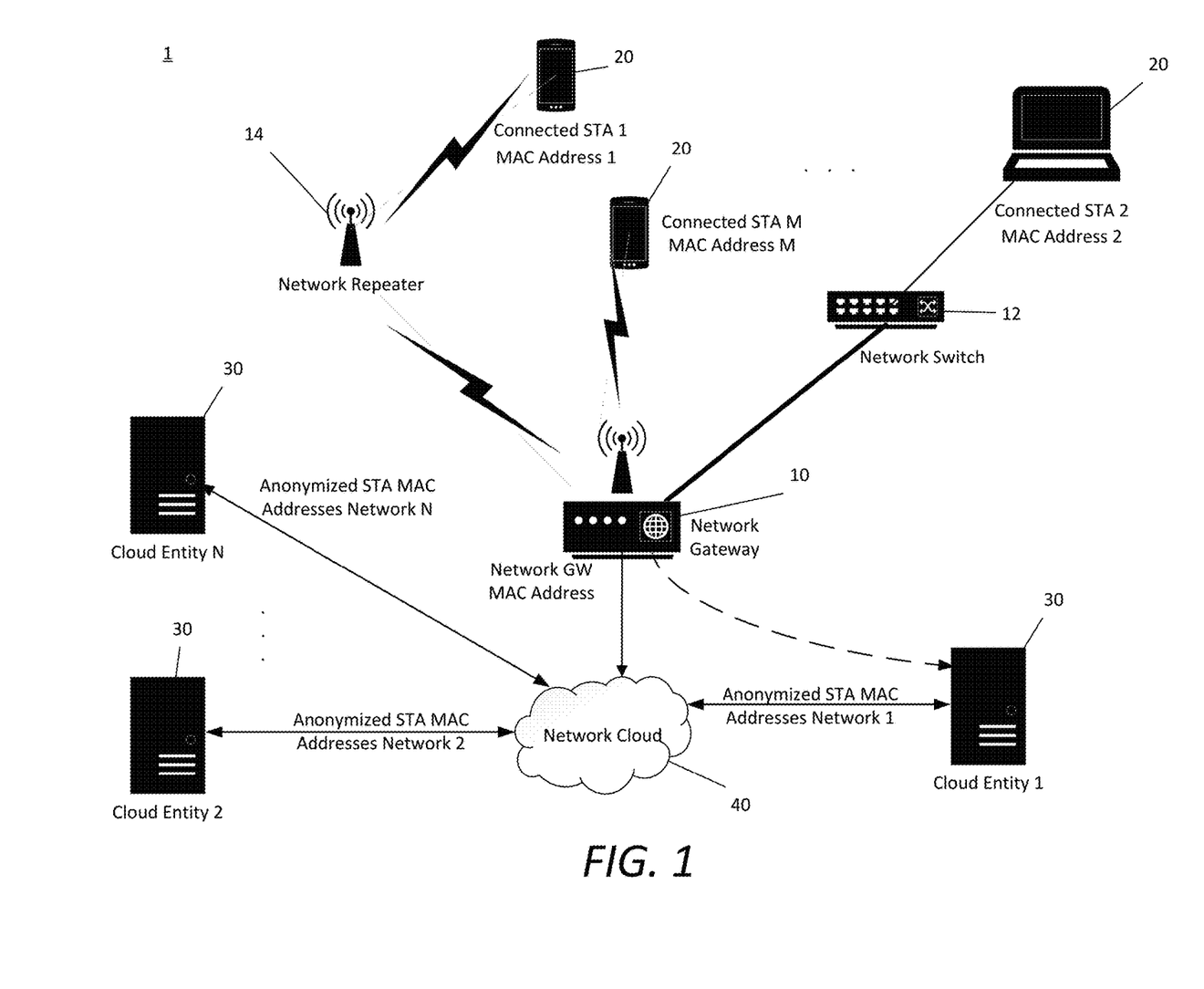
FIG. 1 is a diagram of an example of a network according to some example embodiments.

FIG. 1 is a diagram of an example of a network according to some example embodiments. FIG. 1 shows a possible implementation of a network 1 in which client device information anonymization is utilized. Note that in the drawing, STA denotes a network client device 20 as defined in the 802.11-2016 Specification. In the example network 1 of FIG. 1, there may be multiple client STA devices 20 and multiple cloud entities 30 of multiple external networks 40, and the particular numbers of client STAs 20, cloud entities 30 and/or external networks 40 may be few or many according to various example embodiments.

In the network diagram figure (Network 1 Example) of FIG. 1:

1) Each connected client device 20 (e.g., STA 1, STA 2, [ . . . ], STA M) has a unique EUI-48 MAC address assigned to it by its manufacturer (STA MAC Address).

2) Each network 1 which connects to the cloud 40 has a Gateway 10 or other subtending piece of equipment to which this network is known to higher layer entities (The Cloud). This could be a cable modem, an ONU, an ONT or any device which becomes the gateway 10 for the network 1 to the cloud 40. This device will also have a manufacturer assigned EUI-48 MAC Address (GW MAC Address).

3) This gateway device 10 may offer wired LAN network access, wireless LAN network access, or some other physical layer access for the STAs to gain higher level network access through the network gateway device. The local network may also include one or more network switches 12 and/or one or more network repeaters 14.

4) Each Cloud Entity 30 (e.g., Cloud Entity 1, Cloud Entity 2, [ . . . ], Cloud Entity N) has a method to establish communications between the Network Gateway device 10 and itself. This is typically a URL or some other identifier which uniquely identifies the cloud entity 30 to the network gateway device 10 (Cloud Entity Identifier).

System Information

Figure 2:
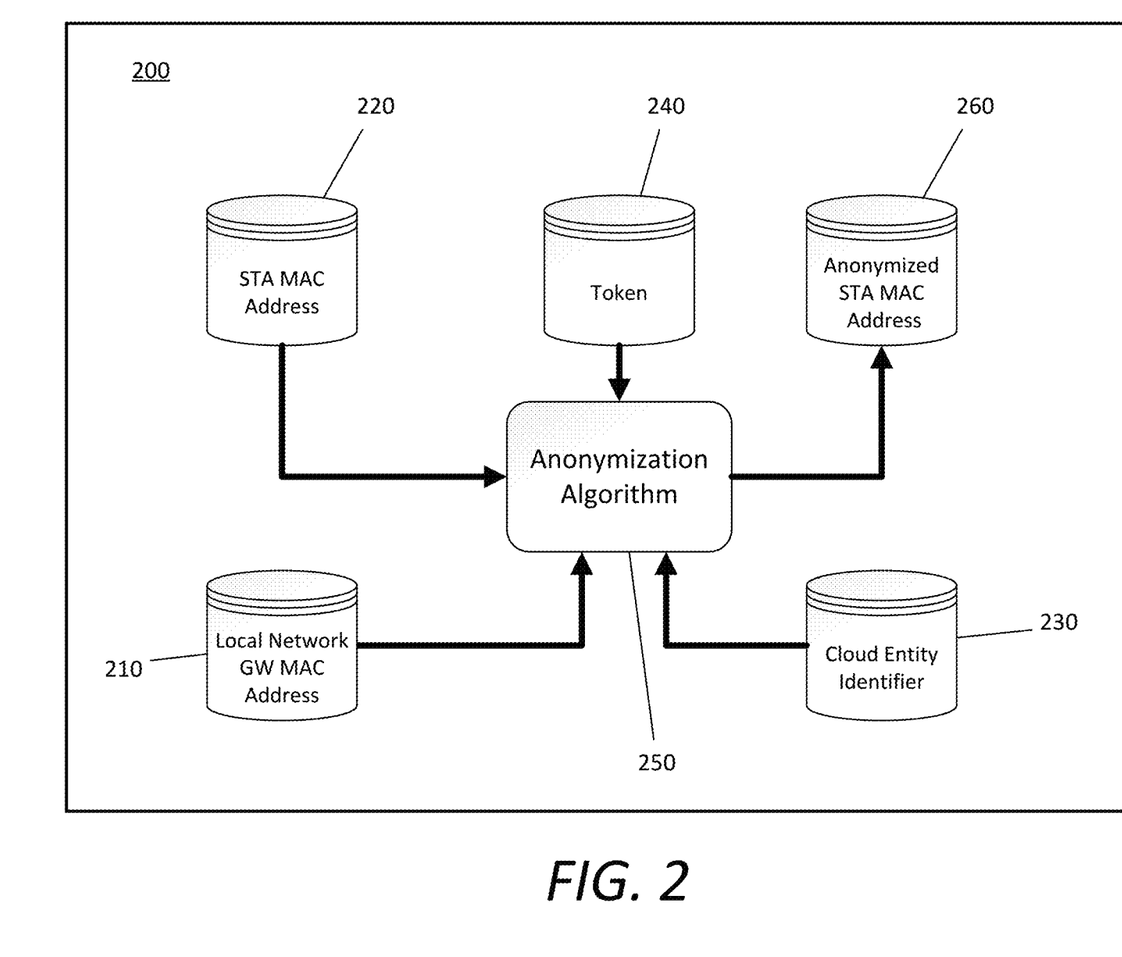
FIG. 2 depicts an example of an anonymization module according to some example embodiments.

FIG. 2 depicts an example of an anonymization module according to some example embodiments. FIG. 2 gives one example of the anonymization module 200, which produces the Anonymized STA MAC Address 260 that is passed to higher layer cloud entities 30. The anonymization module 200 may include circuitry and/or processing to accomplish the Anonymization Algorithm 250 with a Network Gateway device 10, for example. In some example embodiments, the anonymization module 200 may be implemented via the execution of software in the form of computer-readable instructions stored on a memory device by a computer processor. Thus, the Network Gateway device 10 may include a combination of hardware and software programmed to generate anonymized STA MAC addresses 260 that are unique to each local network 1 as well as unique to cloud entities 30 of external networks 40. However, the described method does not preclude the use of a hardware block (e.g., various logic gates) to perform the anonymization algorithm 250 in some other example embodiments.

A detailed description of the exemplary internal structural components of a Network Gateway device 10 shown in FIG. 1 that implements the anonymization module 200 shown in FIG. 2 will be provided below with reference to FIG. 5. In general, it is contemplated by the present disclosure that the local network gateway 10 is a hardware device that includes electronic components or electronic computing devices operable to receive, transmit, process, store, and/or manage data and information associated with the system, which encompasses any suitable processing device or control circuitry adapted to perform computing tasks consistent with the execution of computer-readable instructions stored in a memory or a non-transitory computer-readable medium.

As part of this anonymization method's implementation, a software process will be executed by a processor to gather the individual MAC addresses 210 and 220 of both the Network Gateway device 10 and each connected STA device 20 for which data is to be provided to the external network cloud 40 via the Network Gateway device 10. Additionally, the software process executed by the processor shall gather information about the connection to cloud based network entities 30, which gather information from the local network 1. The defined method utilizes the pieces of information gathered (STA MAC Address 220, and network interface addresses such as a CM MAC Address or other GW MAC Address 210) and cryptographic techniques to generate pieces of randomized data associated with each connected STA device 20 for presentation outside of the local network 1 (e.g., for transmission to cloud entities 30 of external networks 40).

Anonymized MAC Address Generation

Figure 3:
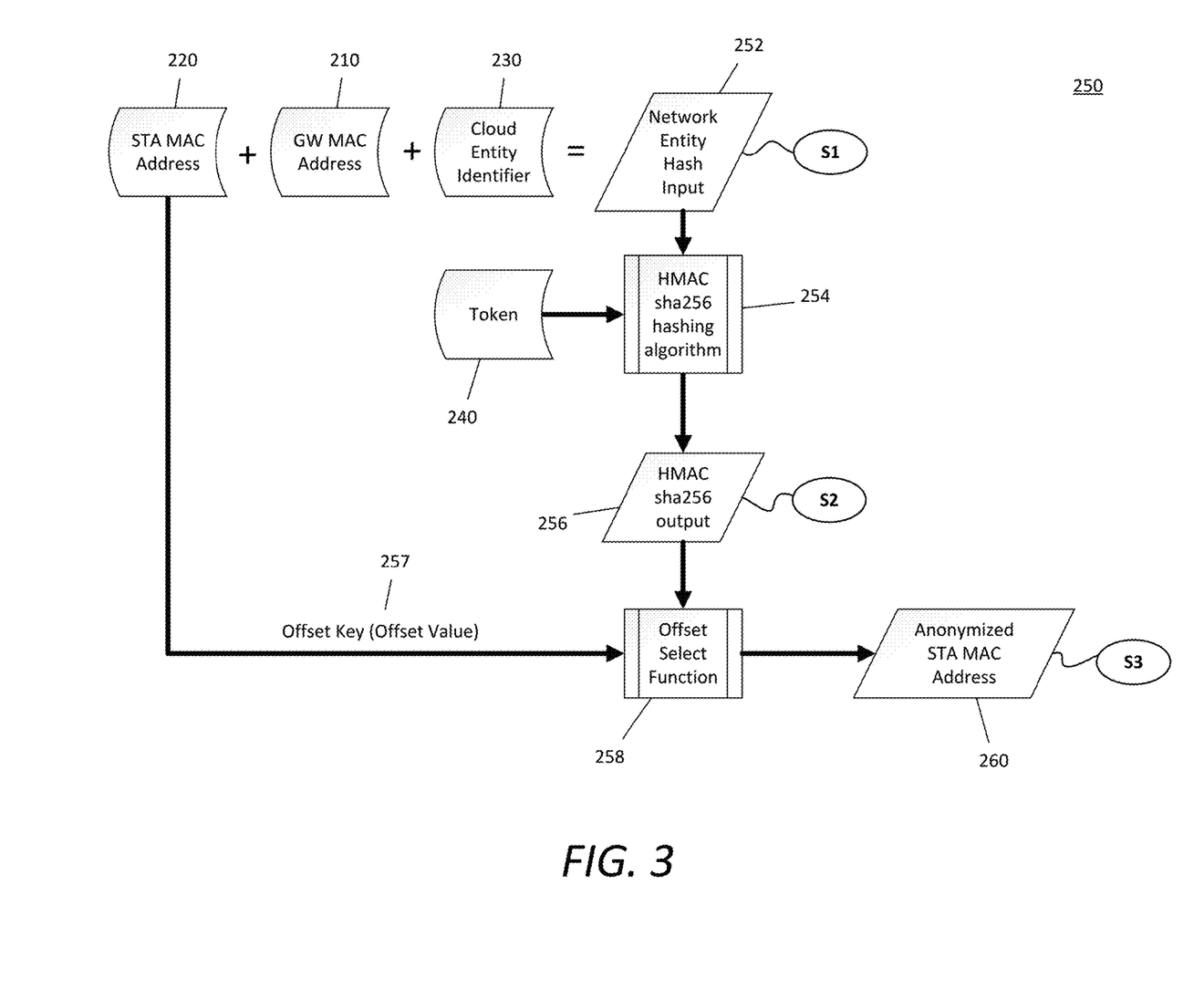
FIG. 3 depicts details of an example of an anonymization method, in accordance with some example embodiments.

FIG. 3 depicts details of an example of an anonymization method, in accordance with some example embodiments. FIG. 3 is a flow diagram of a process performed by a network gateway device 10 for anonymizing client identifying information (e.g., STA MAC address 220). For generation of the anonymized client STA MAC address 260, a processor of the network gateway device 10 may execute an anonymization algorithm 250 stored in a memory of the network gateway device 10 according to some example embodiments.

In some example embodiments, a crux of the illustrative anonymization method 250 is an HMAC-SHA256 hashing algorithm 254 which takes as inputs:

1) The local Network Gateway device MAC Address 210 in EUI-48 format (e.g., 12 hexadecimal characters).

2) A Cloud Entity Identifier 230, which is a per cloud entity value that uniquely identifies the external network entity 30 to which STA data is to be passed. In some example embodiments, this could be a URL Address of a network server or any other data which uniquely identifies the network server addressing the STA data. —(Variable character length). In some other example embodiments, this could also be a Network Identifier (or Name) assigned by the local network, for example, "Network1", "ACS Server1" or another identifier which is unique between all other external network servers which access the STA data.

3) The client STA MAC address 220 in EUI-48 format (e.g., 12 hexadecimal characters).

4) A Token value 240, which is a randomized seed value which meets the requirements of a FIPS-198 compliant Token. It is suggested this Token value 240 be at least 32 hexadecimal characters in length. In some example embodiments, the Token value 240 may be generated by and stored in the Network Gateway device 10.

5) An offset key (or offset value) 257, which is an index into the HMAC-SHA256 generated 256 bit (64 hexadecimal character) output 256 from the HMAC-SHA256 hashing algorithm 254 from which to pull the resultant, reported Anonymized STA MAC Address 260 in EUI-48 format (e.g., 12 hexadecimal characters) according to an offset select function 258. This will provide an extra layer of data obfuscation to those who do not possess the client's 'real' EUI-48 MAC address 220. In the case of a 64 hexadecimal character hash value output 256, for example, the 'least significant digit' (e.g., the last character) of the original client STA MAC address 220 may be utilized as the offset key 257 (e.g., a hexadecimal value ranging from 0 to f, which translates to an offset value ranging from 0 to 15 in decimal). In another example, the sum of the 4 lowest or least significant hexadecimal characters of the STA MAC address 220 may be utilized as the offset key 257. These examples would make the offset select function 258 unique on a per client STA device basis. However, some other example embodiments are not limited thereto, and any offset value 257 ranging between 0 and 50 may be selected (e.g., programmatically or randomly) into the 64 hexadecimal character hash array 256.

According to the above-described example embodiment, the reported Anonymized STA MAC address 260 is 12 hexadecimal characters, to align with current EUI-48 MAC address content. However, some other example embodiments are not limited thereto.

According to some example embodiments, the following sections shall define and demonstrate how these inputs may be utilized to generate an anonymized STA MAC address 260 for subsequent transmissions to higher layer network entities (e.g., of an external cloud network).

1.1.1 Cloud Entity Identifier 230

A unique identifier shall be assigned for each external network device (cloud entity) 30 to which client data is to be provided. This identifier MUST be unique for each external network device 30 requesting client data or to which the client data is provided. The identifier 230 could be the URL of the network server, a unique string assigned to the Cloud Entity 30, or any other value that is unique from other cloud entity identifiers.

1.1.2 Token 240

A value generated by a cryptographically random process that is unique to the network gateway device 10. In some example embodiments, this value should be at least 32 hexadecimal characters in length, and should be sufficiently random such that it cannot be derived from any information gathered from the network gateway device 10. This token 240 shall be utilized for calculations described below.

1.1.3 STA MAC Address 220

A value assigned to client station devices connecting to the local network. This value is typically assigned by the manufacturer of the client STA device. In EUI-48 format, this value is 12 hexadecimal characters in length.

1.1.4 Gateway MAC Address 210

A value assigned to the network gateway device 10 by the manufacturer of the GW device. In EUI-48 format, this value is 12 hexadecimal characters in length.

1.1.5 Hash Data Offset 257

An offset key (or offset value) that functions as an index into the HMAC-SHA256 data (hash value output) 256 from which to pull the resultant anonymized client STA MAC address 260 to be reported to a specific cloud entity 30 of an external network 40. For example, the offset key 257 may be any value ranging from 0 to 50 in the case of a 64 hexadecimal character hash value output 256. However, some other example embodiments of the offset are not limited thereto, so long as the offset 257 does not exceed the total length of the hashed output 256 less 12 hexadecimal characters.

1.2 Hash Generation

To generate the per cloud entity hash value 252 for a specific STA 20, execution of a first step (S1) of the Anonymization Method 250 by the Network Gateway device 10 will aggregate (e.g., concatenate or otherwise combine) the contents of the following:

a. The STA MAC Address 220 assigned to the client device 20 for which the anonymized data is to be deduced, b. The GW MAC Address 210 assigned to the local Network Gateway device 10 that is providing the STA data, and c. The Cloud Entity Identifier 230 assigned to the cloud entity 30 of the external network 40.

This resulting data is a string or value known as the Network Entity Hash Input 252.

Thereafter, execution of a second step (S2) of the Anonymization Method 250 by the Network Gateway device 10 will then input:

1) The Network Entity Hash Input 252 and

2) The Token 240 (as described above) into a hash function, such as the HMAC-SHA256 hashing algorithm 254, for example. However, it is contemplated that other known or future-developed hashing algorithms may be utilized in some other example embodiments.

The output of the HMAC-SHA256 hashing algorithm (256 bits) 256 will be converted to a 64 hexadecimal character string by the method in some example embodiments.

Finally, execution of a third step (S3) of the Anonymization Method 250 by the Network Gateway device 10 uses an offset algorithm (Offset Select Function) 258 to choose how far into the 64 hexadecimal characters of generated output data (hash value output) 256 to step, based on an offset key (or offset value) 257, in order to gather the resultant 12 hexadecimal characters of MAC address to report for this given client device 20 for the given Cloud Entity 30 of the external network 40, as the Anonymized STA MAC Address 260 for the client device 20. Once the Anonymized STA MAC Address 260 is generated, it may be safely transmitted to the corresponding cloud entity 30 of the external network 40 by the network gateway device 10.

Figure 4:
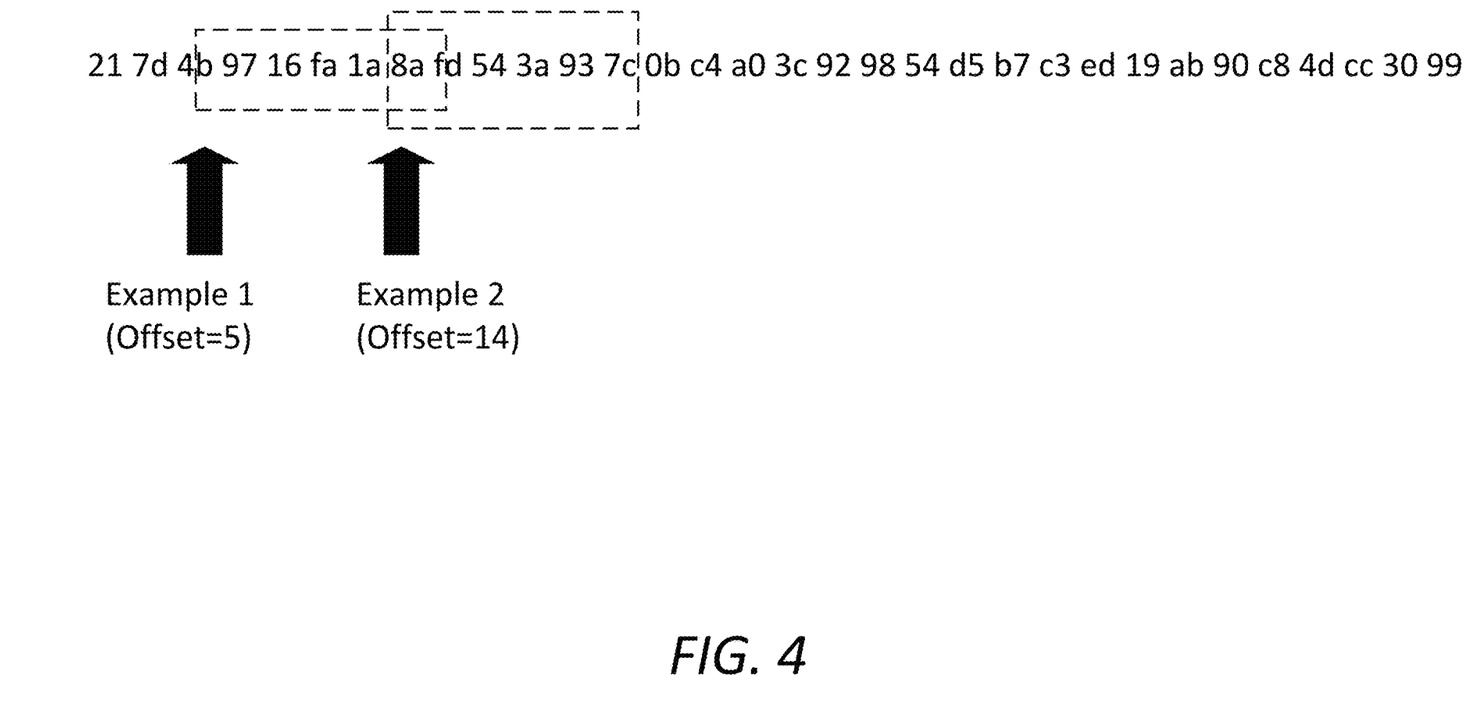
FIG. 4 is a diagram illustrating examples of an offset select function according to some example embodiments.

FIG. 4 is a diagram illustrating examples of an offset select function according to some example embodiments. FIG. 4 depicts two non-limiting examples relating to the selected offset value 257 and resulting anonymized client STA MAC address 260 in connection with step S3 of FIG. 3.

An example STA MAC address 220 having 12 hexadecimal characters may be (00 40 96 24 16 25). In FIG. 4, an example HMAC SHA-256 output 256 (21 7d 4b 97 16 fa 1a 8a fd 54 3a 93 7c 0b c4 a0 3c 92 98 54 d5 b7 c3 ed 19 ab 90 c8 4d cc 30 99) having 64 hexadecimal characters is provided.

In a first example of the offset select function 258, the 'least significant digit' (the last hexadecimal character) of the example STA MAC address 220 may be utilized as the offset 257 into the generated hash value output 256. Thus, the offset key 257='5' in Example 1 of FIG. 4. Then in the example HMAC SHA-256 output 256, this offset value 257 may be applied to skip the first 5 hexadecimal characters (21 7d 4) and select the next 12 hexadecimal characters (b9 71 6f al a8 af) as the resulting Anonymized STA MAC address 260 in Example 1.

In a second example of the offset select function 258 of FIG. 4, a sum of the 4 lowest hexadecimal characters (the last 4 hexadecimal characters) of the example STA MAC address 220 may be utilized as the offset 257 into the generated hash value output 256. Thus, the offset key 257=1+6+2+5='14' in Example 2 of FIG. 4. Then in the example HMAC SHA-256 output 256, this offset value 257 may be applied to skip the first 14 hexadecimal characters (21 7d 4b 97 16 fa 1a) and select the next 12 hexadecimal characters (8a fd 54 3a 93 7c) as the resulting Anonymized STA MAC address 260 in Example 2.

However, it should be appreciated that the examples given in FIG. 4 are merely intended to be illustrative of how the offset select function 258 may work in practice, and any particular MAC addresses, offset select functions, offset values, and selected characters are not intended to limit the scope of the claimed invention in any way. In some example embodiments, the offset value 257 may be computed, alternated, randomized, or otherwise programmatically generated (so long as the offset value 257 is at least 12 hexadecimal characters less than the total length of the hashed output 256). For example, the offset key 257 may be any value ranging from 0 to 50 in the case of a 64 hexadecimal character hash value output 256 (e.g., to allow the remaining 12 hexadecimal characters needed for a MAC address). Thus, the characters that are selected for the anonymized client STA MAC address 260 according to the offset select function 258 may be the first 12 hexadecimal characters, the last 12 hexadecimal characters, or 12 hexadecimal characters somewhere in the middle of the 64 hexadecimal character hash value output 256, depending on the particular offset value 257 used. In some other example embodiments, however, it may also be possible to wrap the index computation across the character boundary of the hash value output 256, such that the offset value 257 may not necessarily be limited to the range from 0 to 50 in the case of a 64 hexadecimal character hash value output 256. For example, the offset select function 258 may select the last 'x' hexadecimal characters of the hash value output 256 and wrap back to the beginning to select the first 'y' hexadecimal characters of the hash value output 256 (for a total of x+y=12 hexadecimal characters) as the anonymized STA MAC address 260), according to the offset value 257. Therefore, many different possible algorithms are contemplated in connection with the offset select function 258.

Figure 5:
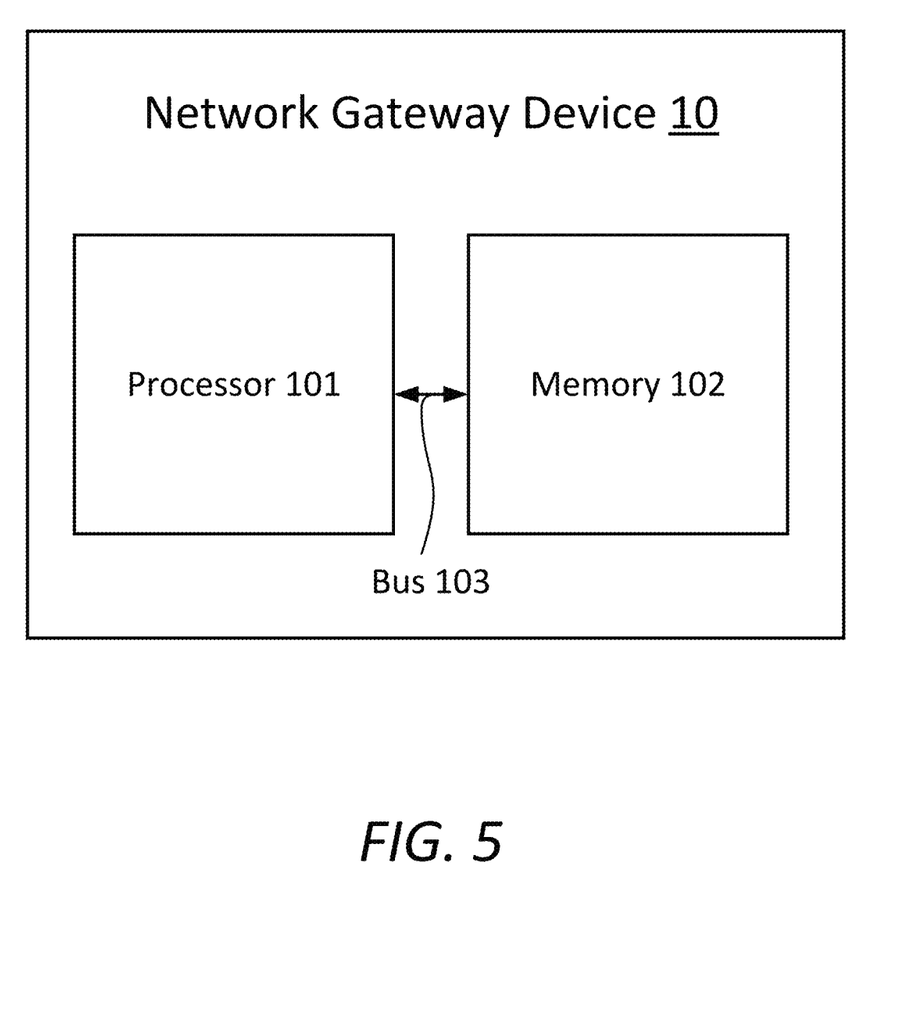
FIG. 5 is a block diagram of an example of a network gateway device according to some example embodiments.

FIG. 5 is a block diagram of an example of a network gateway device according to some example embodiments. As shown in FIG. 5, the network gateway device 10 includes a processor 101, a memory 102, and a bus 103, among other electronic components (e.g., for wired or wireless communication).

The processor 101 controls the general operations of the network gateway device 10 and may include, but is not limited to, a central processing unit (CPU), dedicated control circuitry, a hardware microprocessor, a multi-core processor, a single core processor, a field programmable gate array (FPGA), a microcontroller, an integrated circuit (IC), an application specific integrated circuit (ASIC), a large scale integrated circuit (LSI), system LSI, super LSU or ultra LSI components, a digital signal processor (DSP), or other similar processing device capable of executing any type of instructions, algorithms, programs, or software for controlling the circuitry and performing the above-described functions of the network gateway device 10.

The memory 102 may be a non-transitory computer-readable medium that stores various programming code (e.g., software instructions) and data for implementing an anonymization algorithm when executed by the processor 101. The memory 102 may include a single memory or multiple memories or memory locations that include, but are not limited to, a random access memory (RAM), dynamic random access memory (DRAM), a memory buffer, a hard drive, a database, an erasable programmable read only memory (EEPROM), a read only memory (ROM) a flash memory, logic blocks of a field programmable gate array (FPGA), hard disk or any other various layers of memory hierarchy. The memory 102 can be used to store any type of software instructions including an anonymization program associated with algorithms, processes, or operations for controlling the general functions and operation of the network gateway device 10 and performing the anonymization method for the client station devices. For example, the memory 102 can include RAM as a working memory for the processor 101 and/or a non-volatile memory provided for storage of program code, software, apps, device information, user data, and various other pieces of data associated with anonymization of client STA MAC addresses in the network.

The bus 103 is an internal connection that enables communication between various electronic components of the network gateway device 10. For example, the processor 101 may store and retrieve program instructions and/or data relating to the anonymization algorithm from the memory 102 via the bus 103.

In summary, the above-described Anonymization Method and Network Gateway device provide enhanced privacy and security of client identifying information using cryptographic techniques. In particular, the method and system can generate anonymized STA MAC addresses that are specific not only to each client STA device and local network, but also to each cloud entity of different external networks. Thus, any upper layer functions and/or server devices of external cloud networks will not have access to the 'real' MAC addresses of client STA devices (and will be prevented from reverse engineering such client identifying information from the anonymized STA MAC addresses without knowing the specific details of the anonymization algorithm, particular input data, random token, hash function, and offset values that are used by the local Network Gateway device). Furthermore, the Offset Select Function provides an additional layer of protection and randomization for client identifying information (e.g., by using different offsets on a per client STA device basis). The inventive concepts described herein for anonymizing client STA device identifying data may effectively prevent tracking of the client STA device locations and/or profiling of the client STA device data usage by external cloud networks, for example, in order to comply with privacy laws.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures (FIGS. 1-4). The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

While the principles of the inventive concepts have been described above in connection with specific devices, apparatuses, systems, algorithms, programs and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

The above description illustrates various embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for anonymizing user identifiable information to be transmitted outside of a local network, the method comprising:
generating a first network entity hash input based on (i) a first MAC address assigned to a client station of the local network, (ii) a second MAC address assigned to a network gateway device of the local network, and (iii) a first identifier of a first cloud entity of a first external network to which data of the client station is to be transmitted;
generating a first hash value output based on the first network entity hash input and a random token value using a hashing function;
generating a first anonymized MAC address associated with the client station based on the first hash value output; and
transmitting the first anonymized MAC address associated with the client station to the first cloud entity of the first external network.

2. The method of claim 1, wherein:
generating the first anonymized MAC address associated with the client station includes generating the first anonymized MAC address based on the first hash value output according to an offset select function, and
applying the offset select function includes using a first offset value as an index into the first hash value output indicating a location of data within the first hash value output to be utilized as a base of the first anonymized MAC address.

3. The method of claim 1, further comprising:
generating N additional network entity hash inputs based on (i) the first MAC address assigned to the client station of the local network, (ii) the second MAC address assigned to the network gateway device of the local network, and (iii) N additional identifiers of N additional cloud entities of N additional external networks;
generating N additional hash value outputs based on the N additional network entity hash inputs and the random token value using the hashing function, respectively;
generating N additional anonymized MAC addresses associated with the client station based on the N additional hash value outputs, respectively; and
transmitting the N additional anonymized MAC addresses associated with the client station to the N additional cloud entities of the N additional external networks, respectively,
where N is a value corresponding to a total number of additional cloud entities of additional external networks to which data of the client station is to be transmitted.

4. The method of claim 3, wherein the first identifier of the first cloud entity and each of the N additional identifiers of the N additional cloud entities are different from each other, such that the first anonymized MAC address and each of the N additional anonymized MAC addresses are different from each other.

5. The method of claim 3, wherein:
the first cloud entity and the N additional cloud entities are upper layer network functions or network servers, and
the first identifier of the first cloud entity and the N additional identifiers of the N additional cloud entities are different URL addresses or unique names.

6. The method of claim 3, wherein, in response to the client station leaving the local network and rejoining the local network, the method further comprising:
regenerating the same first anonymized MAC address associated with the client station for the first cloud entity of the first external network; and
regenerating the same N additional anonymized MAC addresses associated with the client station for the N additional cloud entities of the N additional external networks, respectively.

7. A network gateway device for anonymizing user identifiable information to be transmitted outside of a local network, the network gateway device comprising:
a memory storing computer-readable instructions; and
a processor configured to execute the computer-readable instructions to,
generate a first network entity hash input based on (i) a first MAC address assigned to a client station of the local network, (ii) a second MAC address assigned to the network gateway device of the local network, and (iii) a first identifier of a first cloud entity of a first external network to which data of the client station is to be transmitted;
generate a first hash value output based on the first network entity hash input and a random token value using a hashing function;
generate a first anonymized MAC address associated with the client station based on the first hash value output; and
transmit the first anonymized MAC address associated with the client station to the first cloud entity of the first external network.

8. The network gateway device of claim 7, wherein:
generating the first anonymized MAC address associated with the client station includes generating the first anonymized MAC address based on the first hash value output according to an offset select function, and
applying the offset select function includes using a first offset value as an index into the first hash value output indicating a location of data within the first hash value output to be utilized as a base of the first anonymized MAC address.

9. The network gateway device of claim 7, wherein the processor is further configured to execute the computer-readable instructions to:
generate N additional network entity hash inputs based on (i) the first MAC address assigned to the client station of the local network, (ii) the second MAC address assigned to the network gateway device of the local network, and (iii) N additional identifiers of N additional cloud entities of N additional external networks;
generate N additional hash value outputs based on the N additional network entity hash inputs and the random token value using the hashing function, respectively;
generate N additional anonymized MAC addresses associated with the client station based on the N additional hash value outputs, respectively; and
transmit the N additional anonymized MAC addresses associated with the client station to the N additional cloud entities of the N additional external networks, respectively,
where N is a value corresponding to a total number of additional cloud entities of additional external networks to which data of the client station is to be transmitted.

10. The network gateway device of claim 9, wherein the first identifier of the first cloud entity and each of the N additional identifiers of the N additional cloud entities are different from each other, such that the first anonymized MAC address and each of the N additional anonymized MAC addresses are different from each other.

11. The network gateway device of claim 9, wherein:
the first cloud entity and the N additional cloud entities are upper layer network functions or network servers,
the first identifier of the first cloud entity and the N additional identifiers of the N additional cloud entities are different URL addresses or unique names.

12. The network gateway device of claim 9, wherein, in response to the client station leaving the local network and rejoining the local network, the processor is further configured to execute the computer-readable instructions to:
regenerate the same first anonymized MAC address associated with the client station for the first cloud entity of the first external network; and
regenerate the same N additional anonymized MAC addresses associated with the client station for the N additional cloud entities of the N additional external networks, respectively.

13. A non-transitory computer-readable storage medium containing program instructions for anonymizing user identifiable information to be transmitted outside of a local network, which when executed by a processor of a network gateway device, cause the network gateway device to:
generate a first network entity hash input based on (i) a first MAC address assigned to a client station of the local network, (ii) a second MAC address assigned to the network gateway device of the local network, and (iii) a first identifier of a first cloud entity of a first external network to which data of the client station is to be transmitted;
generate a first hash value output based on the first network entity hash input and a random token value using a hashing function;
generate a first anonymized MAC address associated with the client station based on the first hash value output; and
transmit the first anonymized MAC address associated with the client station to the first cloud entity of the first external network.

14. The computer-readable storage medium of claim 13, wherein:
generating the first anonymized MAC address associated with the client station includes generating the first anonymized MAC address based on the first hash value output according to an offset select function, and
applying the offset select function includes using a first offset value as an index into the first hash value output indicating a location of data within the first hash value output to be utilized as a base of the first anonymized MAC address.

15. The computer-readable storage medium of claim 13, wherein the program instructions when executed by the processor further cause the network gateway device to:
generate N additional network entity hash inputs based on (i) the first MAC address assigned to the client station of the local network, (ii) the second MAC address assigned to the network gateway device of the local network, and (iii) N additional identifiers of N additional cloud entities of N additional external networks;
generate N additional hash value outputs based on the N additional network entity hash inputs and the random token value using the hashing function, respectively;
generate N additional anonymized MAC addresses associated with the client station based on the N additional hash value outputs, respectively; and
transmit the N additional anonymized MAC addresses associated with the client station to the N additional cloud entities of the N additional external networks, respectively,
where N is a value corresponding to a total number of additional cloud entities of additional external networks to which data of the client station is to be transmitted.

16. The computer-readable storage medium of claim 15, wherein the first identifier of the first cloud entity and each of the N additional identifiers of the N additional cloud entities are different from each other, such that the first anonymized MAC address and each of the N additional anonymized MAC addresses are different from each other.

17. The computer-readable storage medium of claim 15, wherein:
the first cloud entity and the N additional cloud entities are upper layer network functions or network servers,
the first identifier of the first cloud entity and the N additional identifiers of the N additional cloud entities are different URL addresses or unique names.

18. The computer-readable storage medium of claim 15, wherein, in response to the client station leaving the local network and rejoining the local network, the program instructions when executed by the processor further cause the network gateway device to:
regenerate the same first anonymized MAC address associated with the client station for the first cloud entity of the first external network; and
regenerate the same N additional anonymized MAC addresses associated with the client station for the N additional cloud entities of the N additional external networks, respectively.

* * * * *